(12) United States Patent
Almazán Campillay et al.

(10) Patent No.: US 11,002,032 B2
(45) Date of Patent: May 11, 2021

(54) SELF-CENTRING AND ENERGY-DISSIPATING SEISMIC ISOLATION DEVICE AND SYSTEM OF THE ELASTOMERIC-FRICTIONAL TYPE

(71) Applicant: PONTIFICIA UNIVERSIDAD CATÓLICA DE CHILE, Santiago (CL)

(72) Inventors: José Luis Almazán Campillay, Santiago (CL); Nicolás Felipe Tapia Flores, Santiago (CL)

(73) Assignee: PONTIFICIA UNIVERSIDAD CATÓLICA DE CHILE, Santiago (CL)

( * ) Notice: Subject to any disclaimer, the term of this patent is extended or adjusted under 35 U.S.C. 154(b) by 0 days.

(21) Appl. No.: 16/907,577

(22) Filed: Jun. 22, 2020

(65) Prior Publication Data

US 2020/0318373 A1      Oct. 8, 2020

Related U.S. Application Data

(63) Continuation of application No. PCT/CL2018/050127, filed on Dec. 18, 2018.

(30) Foreign Application Priority Data

Dec. 22, 2017   (CL) .................... 3357-2017

(51) Int. Cl.
*E04H 9/02* (2006.01)
*F16F 1/373* (2006.01)
(Continued)

(52) U.S. Cl.
CPC .......... *E04H 9/023* (2013.01); *F16F 1/3732* (2013.01); *F16F 1/44* (2013.01); *F16F 15/08* (2013.01);
(Continued)

(58) Field of Classification Search
USPC ................. 52/167.1, 167.4, 167.5, 167.6
See application file for complete search history.

(56) References Cited

U.S. PATENT DOCUMENTS

4,187,573 A * 2/1980 Fyfe ................ E01D 19/041
                                                          14/73.5
5,014,474 A * 5/1991 Fyfe ................... E02D 31/08
                                                          14/73.5
(Continued)

*Primary Examiner* — Brian E Glessner
*Assistant Examiner* — Adam G Barlow (57) ABSTRACT

A self-centring and energy dissipating seismic isolation device of the elastomeric frictional-type for structures and industrial equipment comprises: first and second metal plates respectively joined, one to the structure or equipment and the other to its foundations, the first metal plate being fixed thereto and the second metal plate being rotatably joined thereto by a column; at least one elastomeric ring between the plates; and a central restrictive bar orthogonally joined to the first plate and extending through the elastomeric ring and through a central through-hole in the second plate, a nut being screwed to the free end of the bar and having a spherical curved-convex bottom in sliding contact and corresponding with a spherical curved-concave inner surface part of the central through-hole. An isolation system can comprise several of these devices and columns or just one pair of devices at the ends of a central column in combination with sliding support pillars.

9 Claims, 5 Drawing Sheets

(51) Int. Cl.
   *F16F 1/44*   (2006.01)
   *F16F 15/08*  (2006.01)

(52) U.S. Cl.
   CPC .............. *F16F 2224/0208* (2013.01); *F16F 2230/0023* (2013.01); *F16F 2234/02* (2013.01); *F16F 2234/06* (2013.01)

(56) References Cited

U.S. PATENT DOCUMENTS

| | | | | |
|---|---|---|---|---|
| 5,071,261 A * | 12/1991 | Stuve | ............... | F16F 15/08 384/36 |
| 5,161,338 A * | 11/1992 | Tada | ............... | B32B 7/02 52/167.1 |
| 5,946,866 A * | 9/1999 | Weglewski | ............... | E04H 9/022 52/167.1 |
| 6,116,784 A * | 9/2000 | Brotz | ............... | F16C 27/00 384/99 |
| 6,948,284 B2 * | 9/2005 | Chiang | ............... | E04H 9/023 52/167.1 |
| 8,424,253 B2 * | 4/2013 | Loewen | ............... | E04H 9/021 52/167.4 |
| 8,668,968 B2 * | 3/2014 | Wakana | ............... | C08L 9/00 428/34.1 |
| 8,789,320 B1 * | 7/2014 | Bradford | ............... | E01D 19/041 52/167.6 |
| 10,662,645 B2 * | 5/2020 | Kochiyama | ............... | F16F 13/04 |
| 2007/0283635 A1 * | 12/2007 | Lee | ............... | E04H 9/022 52/167.7 |
| 2014/0338271 A1 * | 11/2014 | Yakoub | ............... | F16F 15/022 52/167.5 |
| 2015/0361656 A1 * | 12/2015 | Miyazaki | ............... | B22D 19/16 52/167.8 |
| 2020/0318373 A1 * | 10/2020 | Almaz N Campillay | ............... | E04B 1/00 |

* cited by examiner

SELF-CENTRING AND ENERGY-DISSIPATING SEISMIC ISOLATION DEVICE AND SYSTEM OF THE ELASTOMERIC-FRICTIONAL TYPE

FIELD

The invention relates to a self-centring and energy-dissipating seismic isolation device and system of the elastomeric-frictional type for lightweight structures and industrial equipment, as well as slender structures, particularly for structures and equipment supported on pillars, legs, or the like on foundations.

BACKGROUND

There are numerous seismic isolation devices available on the market. The best known are elastomeric isolators with or without a lead core and sliding frictional pendulum isolators. The first ones consist of rubber and steel sheets bonded together by vulcanization, in which the lateral flexibility is provided by the rubber exerting shear work. The second are devices that function as a sliding bearing on a concave (generally spherical or cylindrical) surface with friction. For light structures only the latter are appropriate, since the period of isolation does not depend on the weight of the structure, but on the radius of curvature of the concave surface. However, its cost is relatively high due to machining of the concave surface. This cost increases even more when the isolating devices are required to resist tensile strength, as is the case with lean structures.

Some low-cost systems for seismic isolation of lightweight equipment and structures have been proposed in the literature. Among the most representative we can mention the following:

(i) the so-called static dynamic interchangeable-ball pendulum system or, in abbreviated form, the SDI-BPS (Tsai C., Lin Y., Chen W., and Su H., Tri-directional shaking table tests of vibration sensitive equipment with static dynamics interchangeable-ball pendulum system. Earthquake Eng & Eng Vib (2010) 9: 103-112); and (ii) the so-called precast prestressed pile or, in abbreviated form, the PPP (Pinochet J., De La Llera J., and Lüders C. Analysis of a kinematic self-centering seismic isolator, Earthquake Engng. Struct. Dyn. 2006; 35: 1533-1561).

The SDI-BPS system is an isolation system that works by rolling between two facing spherical surfaces. A perspective drawing of the SDI-BPS is shown in FIG. 1 of the Tsai et al. document, while FIG. 3 shows the operating conditions of the device under service and seismic loads. Experimental results on a vibrating table show that the SDI-BPS can provide significant damping to rolling isolation systems, in order to reduce displacement and size of the device, and avoid the concentration of stresses that can cause damage to the rolling surface. However, these results correspond to a case of industrial equipment of only 200 kgf of weight mounted on 4 devices. No results are known for heavier structures.

The PPP system for its part is a seismic isolator consisting of a reinforced concrete column with a central pre-stressed cable and two rolling steel surfaces at the upper and lower ends (see FIG. 1). By varying the shapes of the rolling surfaces (see FIG. 6), different relations constitutive of force-deformation for the isolator can be obtained (see FIG. 7). Energy dissipation can be introduced by means of passive reinforcement bars in the rolling interface. This system was initially proposed as a low-cost solution for the seismic protection of social housing, usually located on the outskirts of large cities, where the quality of the soil is usually poor, so the device also works as a foundation pile. However, though its cost would be between 25% and 50% of a conventional rubber isolator, it still represents a high cost if applied to industrial equipment. Furthermore, it is not designed to withstand tensile loads.

On the other hand, U.S. Pat. No. 5,597,240 describes an elastomeric bearing capable of absorbing bending rotations. An embodiment of the device is shown in FIGS. 1 and 2, consisting of a perforated rubber disc between two steel plates. An internal bushing located on the central axis operates as an elastic ball joint allowing relative rotation between the steel plates. Because the bushing must transmit shear stresses, it can only absorb maximum rotations of around 20 milliradians, such as those typically produced by service loads on bridge supports. Larger rotations produce metal-to-metal contact. FIGS. 3 and 4 show another embodiment of the device, formed by a homogeneous disk and four bolts threadedly joined to one of the plates and connected by bushings to the other plate. The relative rotation between the plates has the same limitations as the previous case. Therefore, these bearings are not designed to absorb large rotations such as those required for seismic isolation systems, which can be of the order of 200 milliradians. None of the mentioned embodiments can absorb tensile forces.

Therefore, it would be desirable to provide an anti-seismic solution for lightweight structures or industrial equipment, as well as lean structures, which could solve the problems and shortcomings of prior art isolators for this type of application.

SUMMARY OF THE INVENTION

The invention proposes a seismic isolation device for lightweight structures or industrial equipment, as well as slender structures, all of them supported on foundations, that combines elastomers, which exert compression work, with a spherical metal bearing and that has self-centring and energy-dissipating properties and is configured as a component of a seismic isolation system, even though it may also have application as a direct base isolator for an industrial equipment or slender structure.

The isolating device comprises a first metal plate and a second metal plate parallel to each other and an elastomeric ring confined between both metal plates, not adhered thereto, wherein the first plate is fixedly attached to one between the superstructure to be isolated and the foundations, while the second plate is fixedly attached to a straight-axis structural member or column that is rotatably joined to the other between the superstructure to be isolated and the foundations. The second plate has a central through-hole that is aligned with the axis of the elastomeric ring, is of uniformly decreasing diameter in the direction of the column to which the second plate is fixedly attached and terminates at its narrow end in a spherical curved-concave inner surface part that may be either a bevelled edge of the same hole or a concentric annular projection of the plate.

The device further comprises a restrictive central bar made of metal that is fixedly and orthogonally joined at one end thereof to the first metal plate, either by welding or threaded joint, and has a thread formed at its opposite end (or free end), wherein the restrictive central bar extends through the central void space of the elastomeric ring and through the central through-hole of the second metal plate, past the latter. Additionally, the device comprises a nut having a spherical curved-convex bottom or base, which is screwed to the thread of said other end of the restrictive bar so that said spherical curved-convex bottom of the nut is in sliding contact and has a curvature corresponding with said spherical curved-concave inner surface part of the narrow end of the central through-hole of the second plate, thus confining and pre-compressing the elastomeric ring between the plates.

Optionally, instead of a single elastomeric ring the device may have a plurality of equal and juxtaposed elastomeric rings, with or without metal spacers.

This configuration of the elements of the device enables a controlled rotation of the rigid assembly formed by the second metal plate joined to the straight-axis member or column with respect to the rigid assembly formed by the first metal plate, the restrictive central bar and the nut, when the structure and the device are subject to mechanical oscillations of its foundations, like those of a large earthquake.

As previously described, the isolating device is intended as a component of a self-centring and energy-dissipating seismic isolation system of the elastomeric-frictional type that uses one or more of such devices. In this case the device functions as a column with flexible joints at both ends within a system that can come in two modes:

a) a system comprised of a plurality of supporting columns of a superstructure to be isolated, wherein one such device with the ability to withstand tensile stresses is deployed fixedly attached by its second metal plate to each end of each column, wherein one of the devices of each column is attached by its first metal plate to the superstructure while the other device in each column is attached by its first metal plate to the foundations (or substructure); and b) a system comprised of a single central self-centring or restoring column in combination with 'legs', columns or other straight-axis structure-supporting members supported on frictional sliders, wherein the isolating device is fixedly connected by its second metal plate to one end of the column and is fixedly connected by its first metal plate to one between the superstructure and the foundations (or substructure), while at the opposite end of the restoring column a vertically sliding joint is arranged attached to the other between the superstructure and the foundations.

Alternatively, the device can serve as a base isolator for industrial equipment or a slender structure supported on a pillar fixedly attached to the foundations, wherein the first plate of the device is fixedly attached to the pillar while the second plate of the device is directly attached to the equipment or structure.

The invention is described in detail below, relating it to the figures.

DETAILED DESCRIPTION OF THE INVENTION

Figure 1:
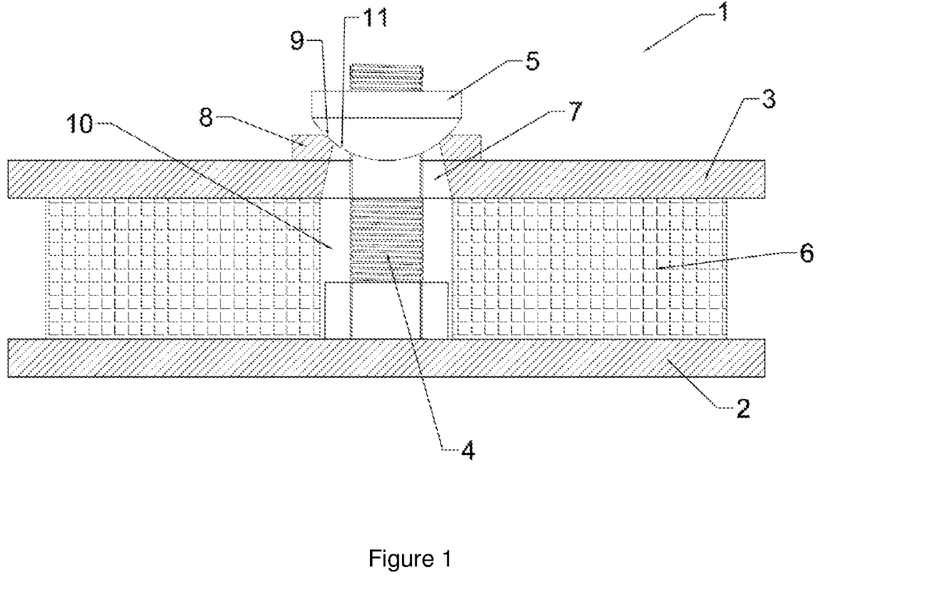
FIG. 1 represents a vertical sectional elevation view of the seismic isolation device according to an exemplary embodiment of the invention when it is at rest.
Figure 2:
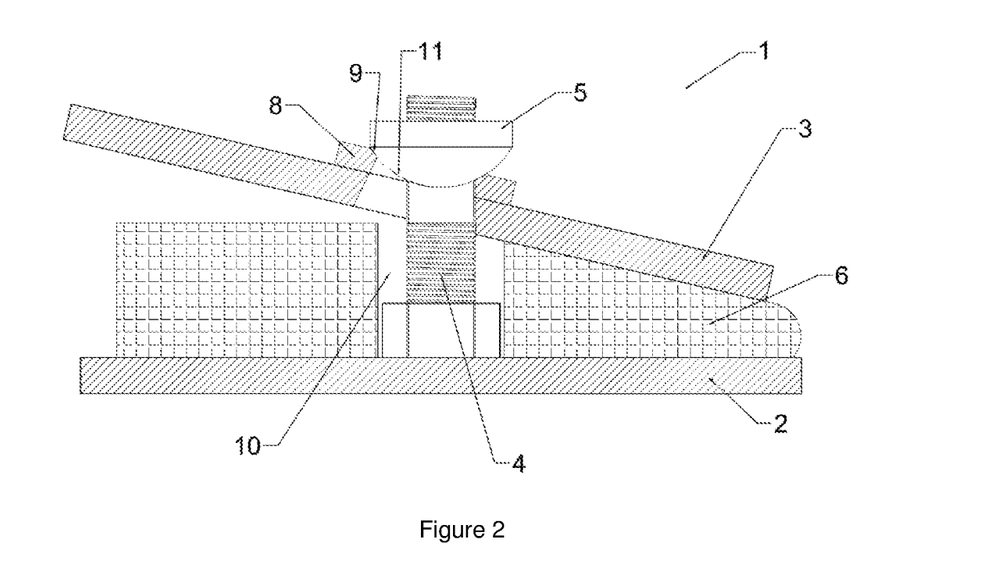
FIG. 2 represents a vertical sectional elevation view of the device of FIG. 1 when subject to mechanical oscillation.

The seismic isolating device (1) of the invention according to the example of FIGS. 1 and 2 consists of an elastomeric ring (6) confined between a first metal plate (2) and a second metal plate (3) parallel to the first (2). In the figures, the first plate (2) is in a lower position and the second plate (3) in an upper one so that said first plate (2) is fixedly attached to the foundations (not shown) while the second plate (3) is fixedly attached to a straight-axis structural member or column (not shown), which in turn is rotatably attached to the structure or equipment to be isolated (not shown). The second metal plate (3) has a central through-hole (7) that is aligned with the axis of axial symmetry of the elastomeric ring and has a diameter that decreases uniformly towards the column to which it is attached. Said hole (7) ends at its narrow end in a part of the plate (3) that has a curved-concave spherical inner surface (9), in this case a concentric annular projection (8).

A restrictive metal bar (4) is fixedly and orthogonally joined at one end thereof and in threaded manner to the first plate (2) and also has a thread formed at the opposite end, or free end, thereof. The restrictive metal bar extends through the central void space (10) of the elastomeric ring (6) and through the central through-hole (7) of the second plate (3), past the latter, where it has a solid member in the form of a nut (5) screwed to the thread, the nut having a base (11) with a curved-convex spherical surface in sliding contact and having a corresponding curvature with the spherical curved-concave internal surface (9) of the annular projection (8) of the second plate (3). The nut (5) is screwed up to a certain number of turns in the thread of the restrictive metal bar, thus confining and pre-compressing the elastomeric ring (6) between the plates (2) and (3).

When an earthquake of great magnitude occurs, a relative movement between the foundations and the structure is generated, which is controlled by the device, as shown in FIG. 2. Specifically, the rigid assembly formed by the second metal plate (3) and the column rotates with respect to the rigid assembly formed by the first metal plate (2), the restrictive metal bar (4) and the nut (5) in order to isolate the structure from the movement of the ground (and foundations).

Figure 3:
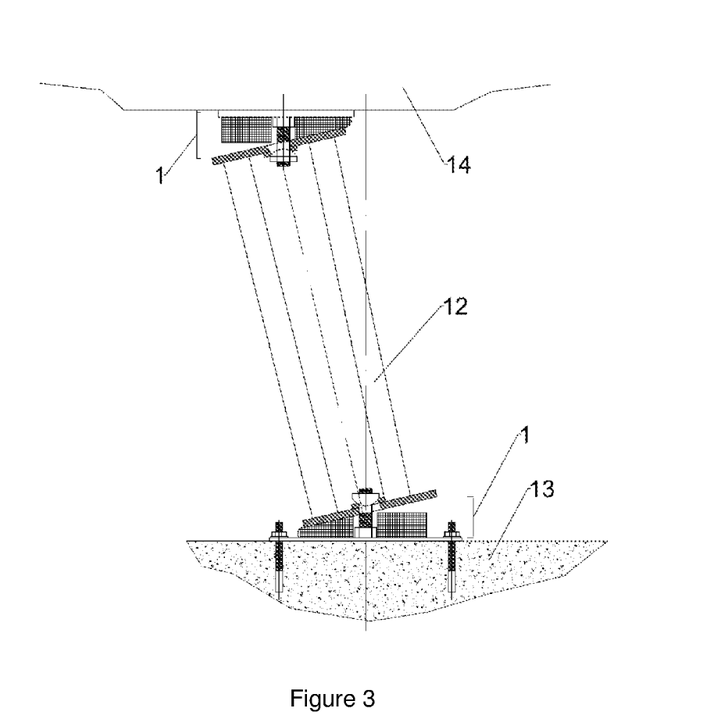
FIG. 3 represents a vertical sectional elevation view of an assembly formed by two devices such as those of FIG. 2 fixedly attached to a column that supports a structure on its foundations and is part of a first embodiment of seismic isolation system according to invention.
Figure 5:
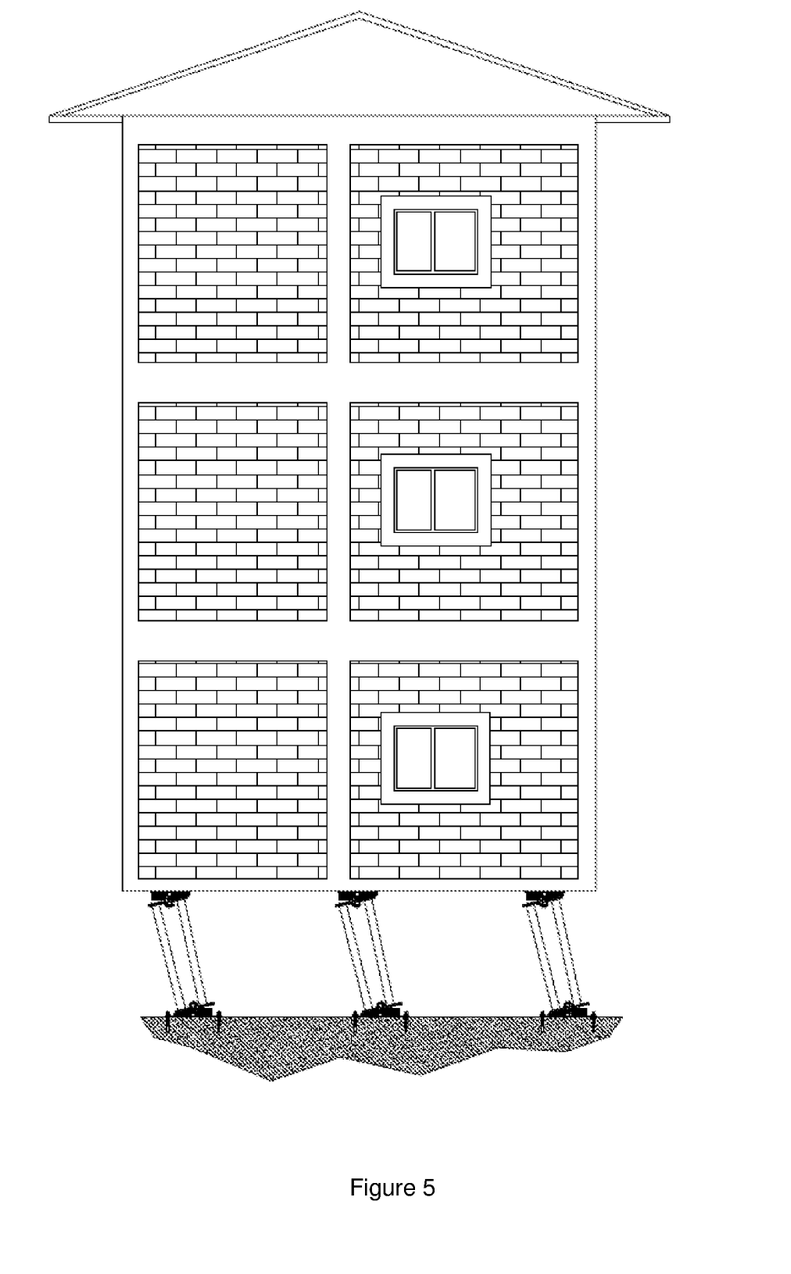
FIG. 5 represents an elevation view of the first embodiment of seismic isolation system according to the invention with a plurality of device and column assemblies such as those of FIG. 3 applied, by way of example, to the isolation of a wooden construction when it is in a situation of displacement due to mechanical oscillation of the foundations.

According to the first embodiment of a self-centring and energy-dissipating seismic isolation system of the elastomeric-frictional type according to the invention illustrated in FIGS. 3 and 5, a device (1) is arranged fixedly connected by its second metal plate to each end of a column (12), wherein one of the devices has its first metal plate fixedly attached to the foundations (13) and the other device has its first metal plate fixedly attached to the structure (14) to seismically isolate. The system carries a plurality of these assemblies of columns with two devices.

Figure 4:
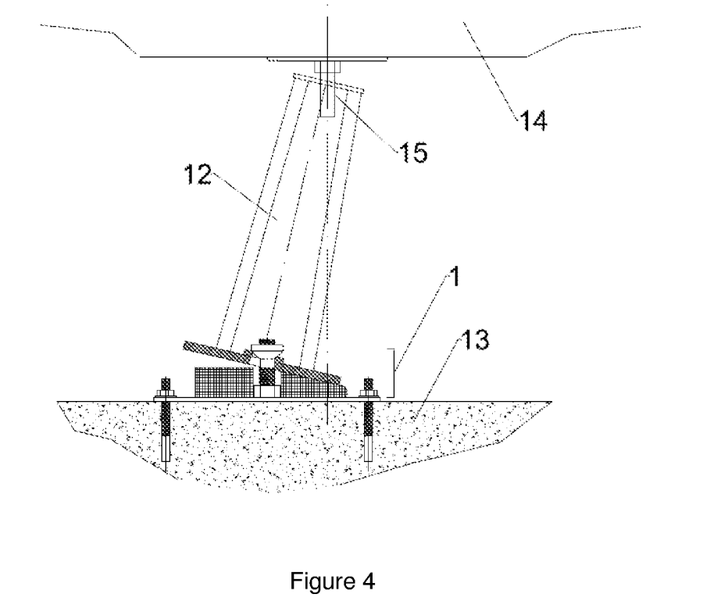
FIG. 4 represents a vertical sectional elevation view of an assembly formed by a device such as that of FIG. 2 at the end of a column and a ball joint at the opposite end of the same column that are part of a second embodiment of seismic isolation system according to the invention.
Figure 6:
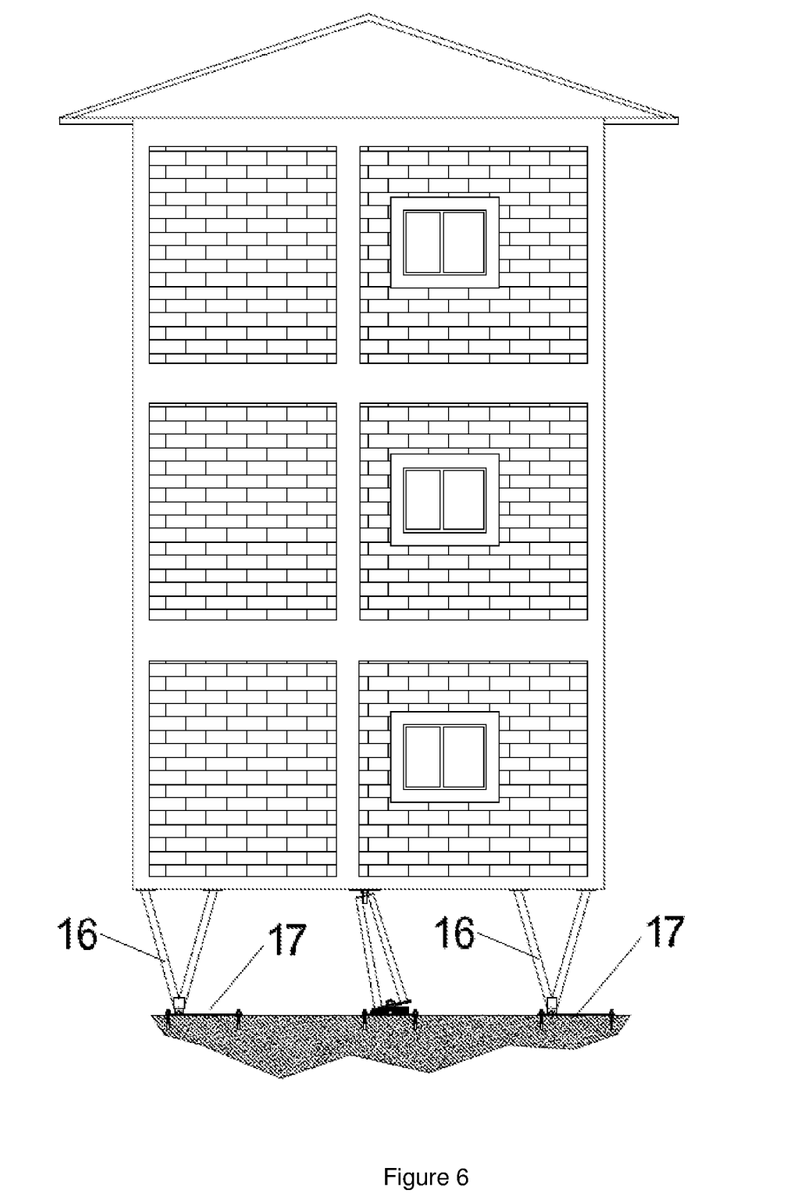
FIG. 6 represents an elevation view of the second embodiment of seismic isolation system according to the invention with the device, column and ball joint assembly of FIG. 4 applied, by way of example, to the same isolation as FIG. 5.

According to the second embodiment of the self-centring and energy-dissipating seismic isolation system of the elastomeric-sliding type according to the invention illustrated in FIGS. 4 and 6, a device (1), which in this case fulfills a restoring or self-centring function, is arranged at one end of a column (12) and at the opposite end thereof a metal ball joint (15) is arranged. In the case shown in the figure, the device (1) is fixedly attached to the lower end of the column by its second metal plate and to the foundations (13) by its first metal plate, while the ball joint is rotatably attached to the upper end of the column and it is fixedly attached to the structure (14) to seismically isolate, but it could be the other way round. The device-column-ball joint assembly is arranged in combination with legs, pillars or other straight-axis supporting members (16) supported on friction sliders (17).

The highlights of the invention are:

(a) it has a self-centring effect and the elastomeric rings exert compression work and not shear work, as is the case with conventional elastomeric seismic isolation;

(b) the elastomeric rings do not require vulcanization with the metallic plates that confine them since they works exclusively under compression, which reduces the cost of the device and facilitates its assembly;

(c) the elastomer behaves in compression in hyper-elastic regime, producing a gradual hardening effect that acts as a displacement limiter, avoiding the use of stoppers;

(d) in the first embodiment of the isolation system, the devices can resist tensile stresses, since such loads are not transferred to the elastomer, but resisted by the threaded metal bars;

(e) it has the capability to withstand large deformations without any damage; and (f) the nut allows to pre-compress the elastomeric ring, thus increasing the lateral stiffness of the device to seismic loads and therefore mechanical efficiency.

Figure 8:
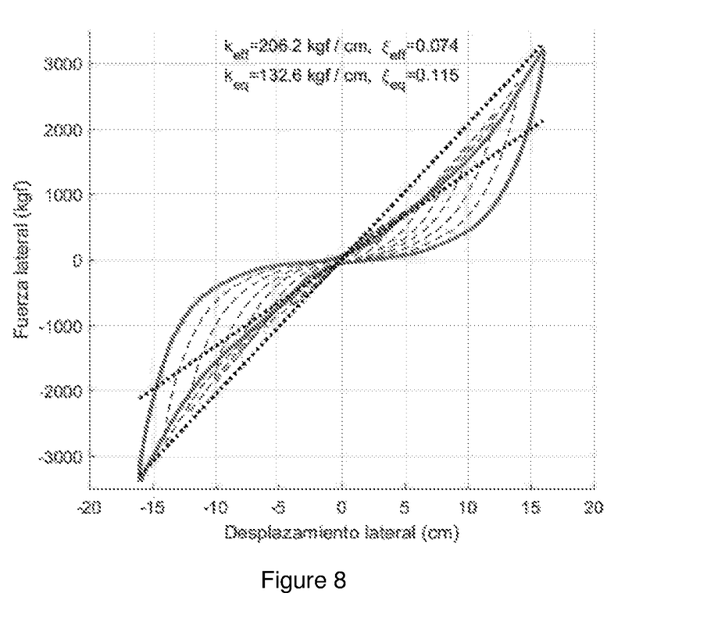
FIG. 8 is a graph representing the lateral load-displacement curve for a test carried out with the self-centring elastomeric-frictional device according to the invention.

The isolating device proposed here is capable of absorbing large rotations, up to 200 milliradians, without metal-to-metal contact. FIG. 8 includes a graph of horizontal displacement versus horizontal force. As noted, displacements of up to 150 mm can be achieved, which is possible due to the large rotation capacity of the device.

Figure 7:
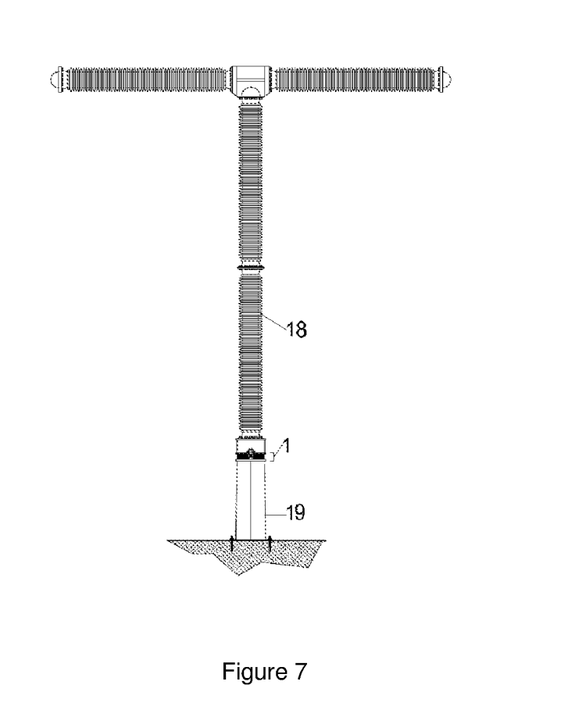
FIG. 7 represents an elevation view of an alternative application of the seismic isolation device of FIG. 1 referring to base isolation of an industrial equipment, in this case a high voltage circuit breaker.

The device can be used as a seismic isolator for:

(a) thin-walled stainless steel tanks with legs for storing liquids, by using the second mode of the system;

(b) wooden structures up to ten stories high or industrial facilities in general in which the equipment is supported by metal columns, by using the first mode of the system (FIG. 5), or the second mode of the system (FIG. 6); and (c) directly on an industrial equipment or slender structure, as in the example of FIG. 7, where the equipment is a high voltage circuit breaker (18) and where the device (1) is fixedly connected by the first plate to the foundations through the supporting pillar (19) bolted to said foundations (13), while the second plate of the device is directly attached to the circuit breaker, without a column in between.

The invention claimed is:

1. A seismic isolation device for lightweight structures, industrial equipment or slender structures supported on foundations, wherein the device comprises a first metal plate and a second metal plate parallel to each other and a vertical axis elastomeric ring confined between both metal plates, wherein the first plate is fixedly attached between the lightweight structure, industrial equipment or slender structure and the foundations, while the second plate is fixedly attached to a straight-axis structural member or column, which is rotatably connected between the lightweight structure, industrial equipment or slender structure and the foundations, wherein the second plate has a central through-hole that is aligned with the vertical axis of the elastomeric ring, and is of a diameter uniformly decreasing in the direction of the straight-axis structural member or column to which it is attached, where the central through-hole has a narrow end, wherein the central through-hole terminates at its narrow end in a spherical curved-concave inner surface part; wherein the device further comprises a restrictive metal central bar that is fixedly and orthogonally joined at one end thereof to the first metal plate and has a thread formed at an opposite end thereof, wherein the restrictive central bar extends through a central void space of the elastomeric ring and the central through-hole of the second metal plate, past the latter, where the central through-hole has, screwed to the thread of the restrictive metal central bar, a nut having a spherical curved-convex bottom or base in sliding contact and corresponding in curvature with said spherical curved-concave inner surface part of the narrow end of the central through-hole of the second metal plate to allow controlled rotation of a rigid assembly that is formed by the second metal plate and the straight-axis structural member or column with respect to a rigid assembly that is formed by the first metal plate, the restrictive metal central bar and the nut, thus isolating the lightweight structure, industrial equipment or slender structure from the movement of its foundations when a large earthquake occurs.

2. The seismic isolation device of claim 1, wherein the first plate is fixedly attached to the foundations through a supporting pillar, while the second plate is directly attached to the lightweight structure, industrial equipment or slender structure to allow controlled rotation of a rigid assembly formed by the second metal plate and the lightweight structure, industrial equipment or slender structure with respect to a rigid assembly that is formed by the first metal plate, the restrictive metal bar and the nut together with the pillar, thus isolating the structure or equipment from the movement of its foundations when a large earthquake occurs.

3. The seismic isolation device according to claim 1, wherein the elastomeric ring is not adhered to the metal plates and it is pre-compressed between the metal plates by the nut screwed to the restrictive central bar.

4. The seismic isolation device according to claim 1, wherein the device comprises a plurality of equal and juxtaposed elastomeric rings.

5. The seismic isolation device according to claim 4, wherein the plurality of equal and juxtaposed elastomeric rings have metal spacers between the rings.

6. The seismic isolation device according to claim 1, wherein the spherical curved-concave inner surface part where the narrow end of the central through-hole of the second plate terminates is a bevelled edge of the same central through-hole.

7. The seismic isolation device according to claim 1, wherein the spherical curved-concave inner surface part where the narrow end of the central through-hole of the second plate terminates is a concentric annular projection of the second metal plate.

8. A seismic isolation system, wherein the system comprises a plurality of columns, each column having opposite ends and a seismic isolation device according to claim 1 fixedly connected by its second metal plate to each end of the column, one of the seismic isolation devices in each column being fixedly attached by its first metal plate to the foundations and the other device being fixedly connected by its first metal plate to the lightweight structure, slender structure or industrial equipment.

9. A seismic isolation system, wherein the system comprises a single central self-centring or restoring column in combination with legs or pillars supported on frictional sliders, wherein a seismic isolation device according to claim 1 is fixedly connected by its second metal plate to one end of said central restoring column and is fixedly connected by its first metal plate to one between the structure or equipment and the foundations, while at the opposite end of the central restoring column a vertically sliding ball joint is arranged attached to the other between the structure or equipment and the foundations.

\* \* \* \* \*